(12) United States Patent
Hypes

(10) Patent No.: US 8,932,452 B2
(45) Date of Patent: Jan. 13, 2015

(54) METHOD FOR SEPARATING ENTRAINED CATALYST AND CATALYST FINES FROM SLURRY OIL

(75) Inventor: Ronald D. Hypes, Houston, TX (US)

(73) Assignee: Cameron International Corporation, Houston, TX (US)

( * ) Notice: Subject to any disclaimer, the term of this patent is extended or adjusted under 35 U.S.C. 154(b) by 317 days.

(21) Appl. No.: 13/348,414

(22) Filed: Jan. 11, 2012

(65) Prior Publication Data

US 2013/0175203 A1 Jul. 11, 2013

(51) Int. Cl.
- C10G 31/10 (2006.01)
- C10G 11/18 (2006.01)
- B01J 8/00 (2006.01)
- B01D 21/26 (2006.01)

(52) U.S. Cl.
CPC .............. *C10G 31/10* (2013.01); *C10G 11/182* (2013.01); *C10G 11/187* (2013.01); *B01J 8/0055* (2013.01); *C10G 11/18* (2013.01); *C10G 2300/70* (2013.01); *C10G 2300/4081* (2013.01); *B01D 21/267* (2013.01)
USPC .............. 208/95; 208/100; 208/113; 208/177

(58) Field of Classification Search
CPC .... C10G 11/18; C10G 11/182; C10G 11/187; C10G 31/10
USPC .................... 208/95, 100, 113, 177
See application file for complete search history.

(56) References Cited

U.S. PATENT DOCUMENTS

| | | | |
|---|---|---|---|
| 2,384,967 A | 9/1945 | Schumacher et al. | |
| 2,431,499 A | 11/1947 | Palmer | |
| 2,847,364 A | 8/1958 | Hirsch | |
| 2,879,224 A | 3/1959 | Lawson | |
| 3,161,583 A | 12/1964 | Pohlenz | |
| 4,003,822 A | 1/1977 | Jo | |
| 4,098,678 A * | 7/1978 | Schwarzenbek | 208/120.1 |
| 4,194,965 A | 3/1980 | Billings et al. | |
| 4,891,129 A | 1/1990 | Barnes | |
| 5,476,988 A | 12/1995 | Hart et al. | |
| 5,827,903 A | 10/1998 | White et al. | |
| 5,879,541 A * | 3/1999 | Parkinson | 208/425 |
| 6,110,356 A * | 8/2000 | Hedrick et al. | 208/113 |
| 6,316,685 B1 | 11/2001 | Lauer et al. | |
| 6,833,078 B2 | 12/2004 | Espinoza et al. | |
| 7,011,740 B2 | 3/2006 | Tallman et al. | |
| 7,144,924 B2 | 12/2006 | Clerici et al. | |
| 7,375,143 B2 | 5/2008 | Kopponen et al. | |
| 7,435,331 B2 | 10/2008 | Peterson et al. | |
| 2004/0069684 A1 | 4/2004 | Tallman et al. | |
| 2010/0144906 A1 | 6/2010 | Hammond et al. | |

OTHER PUBLICATIONS

Bai, Zhi-shan et al. "Removal of Catalyst Particles from Oil Slurry by Hydrocyclone", Separation Science and Technology, 44:2067-2077, 2009.*

* cited by examiner

*Primary Examiner* — Renee E Robinson
(74) *Attorney, Agent, or Firm* — Gable Gotwals

(57) ABSTRACT

A method for removing catalyst, catalyst fines, and coke particulates from a slurry oil stream includes the steps of routing a first slurry oil stream from a first slurry oil source to at least one hydrocyclone, increasing at least one of a temperature and a pressure of the first slurry oil stream prior to it entering the at least one hydrocyclone; passing the first slurry oil stream through the at least one hydrocyclone; and routing a second slurry oil stream exiting an overflow end of the at least one hydrocyclone to a second slurry oil source. The first and second slurry oil sources may be one or more of the following: a main column of a fluid catalytic cracking fractionator, a steam generator, a heat exchanger, a decant slurry oil storage, and a slurry oil storage tank.

10 Claims, 5 Drawing Sheets

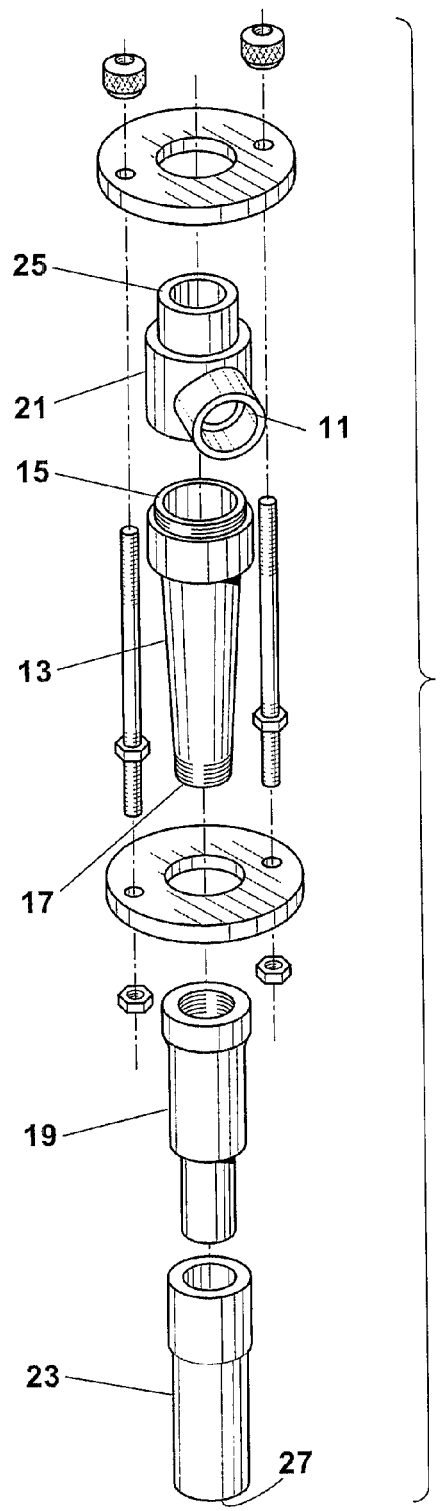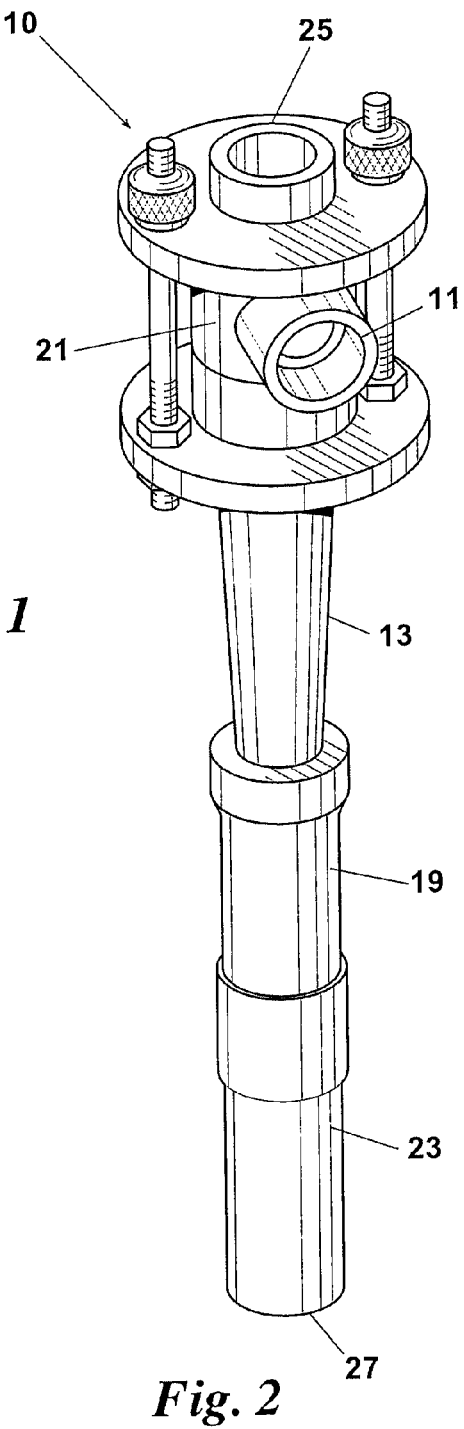
Fig. 1
Fig. 2

(OPTION 1)

(OPTION 2)

METHOD FOR SEPARATING ENTRAINED CATALYST AND CATALYST FINES FROM SLURRY OIL

BACKGROUND OF THE INVENTION

The present invention relates generally to systems, apparatuses and processes associated with the fluid catalytic cracking (FCC) process used in petroleum refineries. More particularly, the invention relates to systems, apparatuses and processes for removing catalyst, catalyst fines and coke particulates typically found in the bottom stream or slurry oil of FCC reactors.

The FCC process is designed to thermo-catalytically upgrade the yield and quality of higher boiling point, distillate, intermediate products provided by the crude atmospheric and vacuum fractionators located upstream in the crude oil refining process. Of all the refinery processes, the FCC process has one of the highest operating costs and is one of the most difficult to operate reliably for extended periods of time. This process is also the primary source of high quality olefans and isobutene for alkylation into a low sulfur and high octane gasoline stream. Therefore, the FCC process is an important process in crude oil refining.

Since the introduction of the FCC process in the 1930s and 40s, the process has undergone a number of changes and upgrades. Those changes and upgrades have focused on catalyst formation, process design, process control, refractory formulation and installation, metallurgy, power recovery, air emissions control, and process availability or uptime. The industry is still searching for ways to improve performance, reduce operating costs, and increase uptime throughout the FCC process.

Every two years, the National Petrochemical & Refiners Association holds a two-day question-and-answer seminar focused strictly on improving the FCC process. At every session there are always questions focused on the removal of catalyst, catalyst fines and coke particulates from slurry oil. To date no long term, cost effective and operationally viable solutions have been found. This is particularly true when it comes to dealing with FCC fractionator slurry oil and the operational problems created when it becomes contaminated.

FCC fractionator slurry oil becomes contaminated with catalyst, catalyst fines and coke particles at levels ranging from less than 0.25% to greater than 2% as carryover from the hydrocarbon vapor entering the fractionator. Contaminant particle size can range from 1 micron (fines) to 90 microns (catalyst). This contamination occurs naturally at very low levels with undamaged and properly designed riser termination and primary and secondary cyclones in the FCC reactor. During an upset in the reactor, or as the FCC reactor is reaching the end of its planned run length, loss rates of catalyst and fines, along with coke fine generation, can increase to much higher levels, thereby affecting operational control of the FCC process. Poorly operating reactor cyclones can result in elevated levels of fresh or equilibrium catalyst loss to slurry oil in the range of 3 to 5 tons per day over the typical 1 to 3 tons per day normally seen.

Catalyst and fines contamination, especially when it occurs for extended periods of time, causes one or more of the following undesirable effects:

1. Increased metallurgical loss rates due to erosion in the slurry oil loop affecting heat exchangers, steam generators, control valves, pumps, and process lines.
2. Increased fouling and plugging of slurry oil loop fractionators, heat exchangers and steam generators, as well as high pressure drops.
3. Increased fouling of slurry oil decant and storage tank bottoms while settling catalyst from slurry oil to meter intermediate or product ash content specifications.
4. Increased operational cost to repair the damaged or fouled equipment.
5. Increased operational costs to clean and dispose of Resource Conservation and Recovery Act (RCRA) hazardous oil wet solids in the bottom of slurry oil storage tanks.
6. Increased operating difficulty in meeting optimum unit performance.

Next to the cost of the catalyst itself, dealing with the above issues can become the second highest operating cost in the FCC process. As the severity of contamination increases, it becomes a major limiting factor to meeting run-length expectations while maintaining optimum product conversion and yield.

Currently there are no technologies that can recover catalyst, catalyst fines and coke particles from a FCC fractionator slurry oil loop because of temperature, pressure and size limitations. Filtration technology has been designed and applied in the lower temperature slurry oil being sent to storage. Several manufacturers have sold a limited number of these filtration units over the last 10 to 15 years, but few if any of these units are operational today. Although the units meet expectations in terms of removal efficiency, the capital and operating costs are prohibitively high and operational control proves difficult and complex. Additionally, inventorying, cleaning and replacing filters is labor-intensive and complicated, redundant filter housings are required, and the filters have to be backwashed frequently. Therefore, a need exists for a cost-effective and efficient method for removing particulates from slurry oil.

SUMMARY OF THE INVENTION

Objects of this invention are to extend fluid catalytic cracking (FCC) process run-length; recover a significant percentage of the fines and almost all of the catalyst lost to slurry oil; reduce fresh catalyst demand when reactor cyclones experience high loss rates; provide a low fines content in the separated slurry oil ahead of downstream heat exchangers, steam generators, control valves, pumps, and process lines; and reduce or eliminate the need for fines settling and cleanout in storage tanks.

A more particular object of this invention is a method for removing catalyst, catalyst fines, and coke particulates from a slurry oil stream as employed in a petroleum refining process. The method includes routing a first slurry oil stream from a first slurry oil source to at least one hydrocyclone; increasing the temperature, the pressure, or both the temperature and pressure of the first slurry oil stream prior to it entering a hydrocyclone; passing the first slurry oil stream through the hydrocyclone; and routing a second slurry oil stream exiting an overflow end of the hydrocyclone to a second slurry oil source. The first and second slurry oil sources may one or more of the following: a main column of a fluid catalytic cracking fractionator, a steam generator, a heat exchanger, a decant slurry oil storage, or a slurry oil storage tank.

BRIEF DESCRIPTION OF THE DRAWINGS

FIG. 1 is an exploded view of a preferred embodiment of a hydrocyclone vessel used in a method for separating entrained catalyst, catalyst fines, and coke particulates from slurry oil in a fluid catalytic cracking (FCC) process.

FIG. 2 is an isometric view of the hydrocyclone vessel of FIG. 1.

DETAILED DESCRIPTION OF THE PREFERRED EMBODIMENTS

Figure 3:
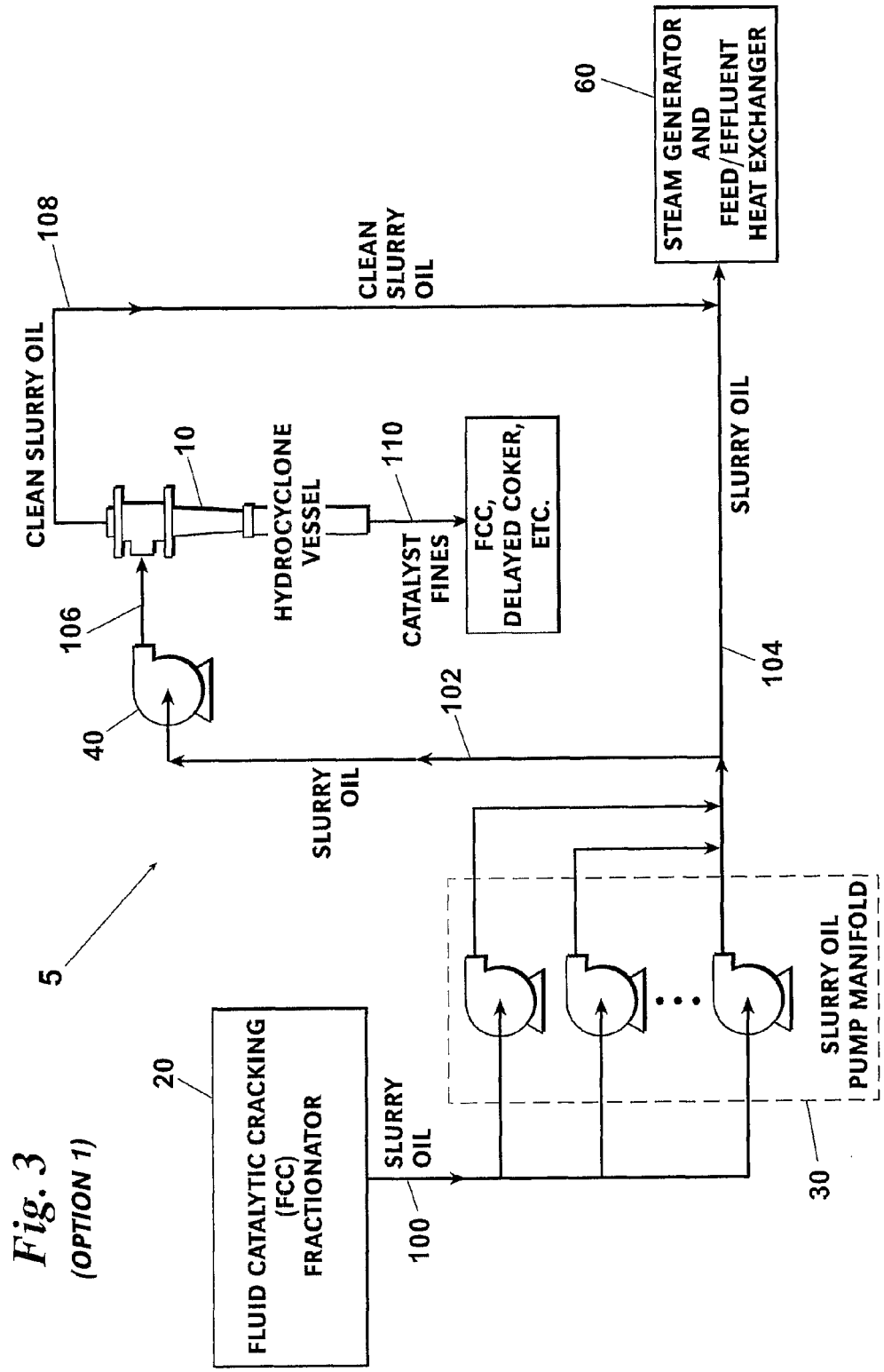
FIG. 3 is a process flow diagram of a preferred embodiment of the method for separating entrained catalyst, catalyst fines, and coke particulates from slurry oil in a fluid catalytic cracking (FCC) process. Slurry oil from an FCC fractionator is passed through one or more hydrocyclone vessels. The overflow exiting the hydrocyclone vessel contains substantially clean slurry oil and may be routed to downstream processes such as steam generators and heat exchangers. The oil wet solids underflow—which contains removed catalyst, catalyst fines and coke particulates—remains pumpable and may be routed back to the FCC fractionator, sent to the delayed coker, or sent elsewhere.

Preferred embodiments of a method for removing entrained catalyst, catalyst fines and coke particulates from a slurry oil stream will now be described in reference to the drawings. Elements shown by the drawings are identified by the following numbers:

FIGS. 1 & 2 illustrate a hydrocyclone vessel 10 well-suited for use in this method, namely, a MOZLEY™ hydrocyclone (CAMERON Process Systems, Houston, Tex.). Hydrocyclone 10 has an inlet 11 to a vortex finder cap 21 located at the upper or overflow end 15 of the body 13. The inlet flow entering inlet 11 is directed tangentially into the cap 21. Vortex finder cap 21 is designed to create spin and centrifugal force in the incoming oil slurry stream and provide for a predetermined $d_{50}$ cut point. The entrained catalyst, catalyst fines and coke particulates move outward toward the internal walls of the body 13 where they mass and spin down the wall toward underflow end 17 and into spigot 19. Spigot 19 is selected to allow precise control of underflow density. A spray reducer 23 may be attached to spigot 19. The underflow exiting at reducer end 27 is a pumpable underflow. The substantially clean slurry oil moves inward toward the central longitudinal axis of hydrocyclone 10 and upward toward the overflow end 15, exiting at outlet 25. Hydrocyclone 10 is preferably a ceramic cyclone having a one-inch outlet 17.

The use of hydrocyclones to separate contaminants from a liquid stream is well known in the crude oil processing and refining field. However, because of temperature, pressure and size constraints, hydrocyclones have not been applied in the fluid catalytic cracking (FCC) fractionator slurry oil loop. The FCC fractionator slurry oil loop typically includes the main column of the fractionator and storage vessels and equipment such as steam generators and heat exchangers located downstream of the main column. (The main column is also called the distillation column or the main fractionator.)

Therefore, the use of hydrocyclones is limited to the reactor side of the refining process, upstream of the main column. For example, hydrocyclones are applied to the vapors exiting the reactor and being routed to the main column of the FCC fractionator for separation. Hydrocyclones in combination with other types of separation units have been proposed for use in removing catalyst fines from slurry oil used in the reactor. See e.g., U.S. Pat. No. 6,833,078 to Espinoza et al. and U.S. Pat. No. 7,144,924 to Clerici et al. The separation units involve the use of settlers, filters, or extractants (or some combination thereof). These units are applied to the bottom fractions or slurry oil exiting the main column of FCC fractionator for return to the reactor.

The method disclosed herein makes use of hydrocyclones in the FCC slurry oil loop located between the main column of the FCC fractionator and various downstream processes, equipment and storage vessels. The method includes raising the temperature, pressure, or temperature and pressure of slurry oil exiting the main column of the FCC fractionator, other downstream processes, or storage tanks and passing this temperature- or pressure-elevated slurry oil stream through one or more hydrocyclones. The hydrocyclones separate the pressure-elevated slurry oil stream into a substantially clean, overflow slurry oil stream and a catalyst- and catalyst fine-laden underflow stream.

Figure 6:
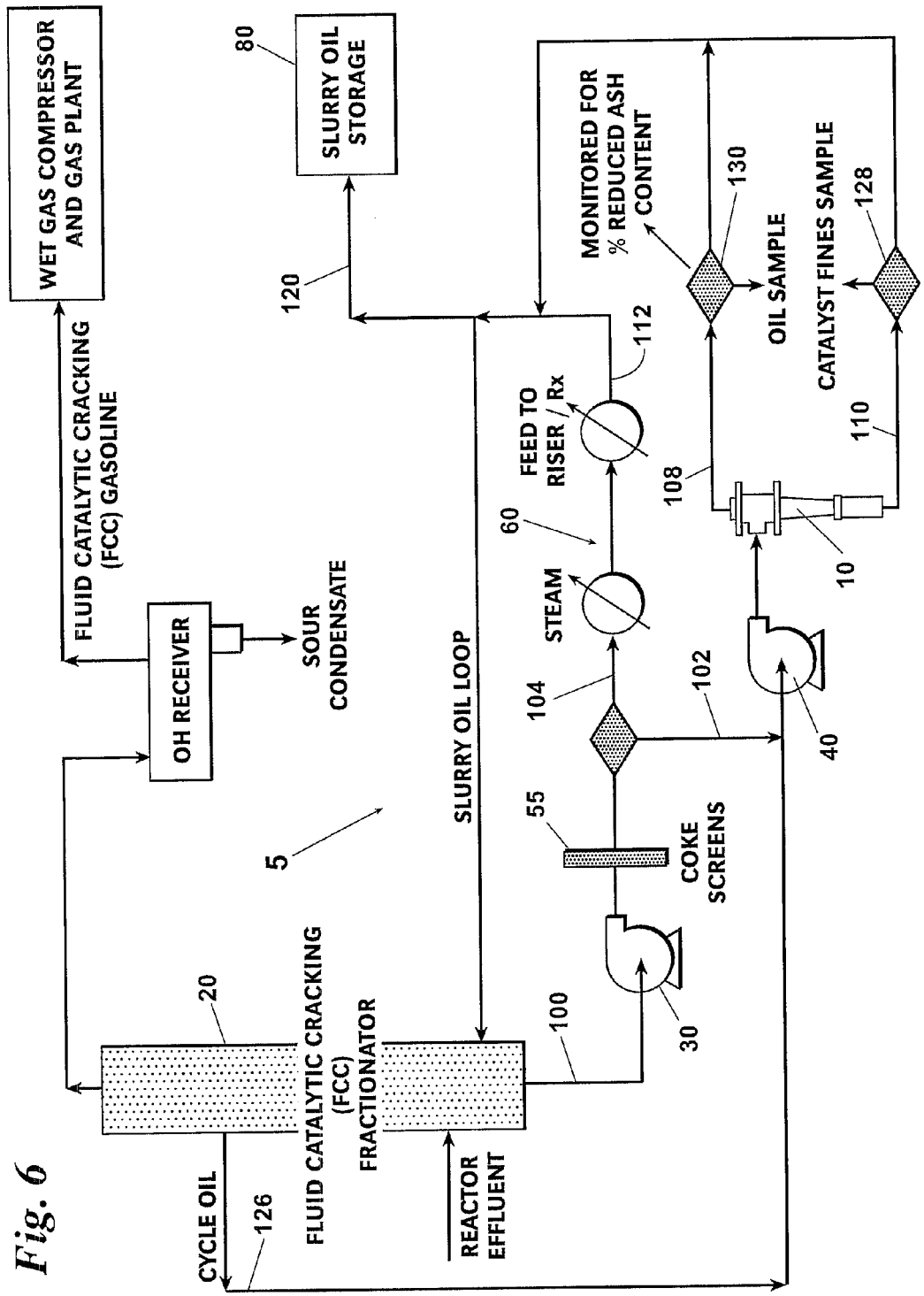
FIG. 6 is a process flow diagram of yet another preferred embodiment of the method. One or more hydrocyclone vessels are placed in the slurry oil loop located between the FCC fractionators and downstream steam generators and heat exchangers. The overflow and underflow exiting the hydrocyclone vessel may be sampled. Clean slurry oil may be sent to storage or recycled back to the FCC fractionator. The underflow, which remains pumpable and contains the recovered oily catalyst and catalyst fines, may be routed to the feed side of the FCC fractionator or sent elsewhere.

Referring now to FIGS. 3 & 6, a FCC slurry oil loop 5 includes a bottom fractions or slurry oil stream 100 that is continuously removed from the main column of an FCC fractionator 20 and routed to a slurry oil pump manifold 30. The temperature of slurry oil stream 100 when it exists FCC fractionator 20 is typically in a range of about 700° to 730° F., that is, a temperature below the coking temperature.

Pump manifold 30 increases the pressure of slurry oil stream 100 to provide elevated pressure slurry oil streams 102, 104. In a preferred embodiment, the pressure of slurry oil streams 102, 104 is about 3.5 to 4 times greater than that of slurry oil stream 100. Slurry oil stream 104 is routed to downstream steam generators and feed or effluent heat exchangers 60. Slurry oil stream 102 is routed to a pump or pump manifold 40, which again elevates the pressure of stream 102 to produce a second elevated pressure slurry oil stream 106. In a preferred embodiment, the pressure of slurry oil stream 106 is about twice that of stream 102. Stream 102 may be supplemented by a cycle oil stream 126 from FCC fractionator 20 (see FIG. 6).

Slurry oil stream 106 passes into hydrocyclone 10 where it is separated into a substantially clean, overflow slurry oil stream 108 and a catalyst- and catalyst fine-laden "dirty" underflow stream 110. Preferably, about 70 to 80% of fines and close to 100% of the catalyst entrained in slurry oil stream 106 is removed by hydrocyclone 10 and contained in underflow stream 110. Overflow stream 108 exits hydrocyclone 10 and is routed (along with stream 104) to downstream steam generators and feed or effluent heat exchangers 60. Overflow stream 108 may be sampled 130 and monitored for % reduced ash content (see FIG. 6). Underflow stream 110, which remains pumpable, may be recycled back to the feed side of the FCC fractionator 20 or sent to a delayed coker, slop oil treatment or offsite processing. Underflow stream 110 may also be sampled 128 and monitored.

Figure 4:
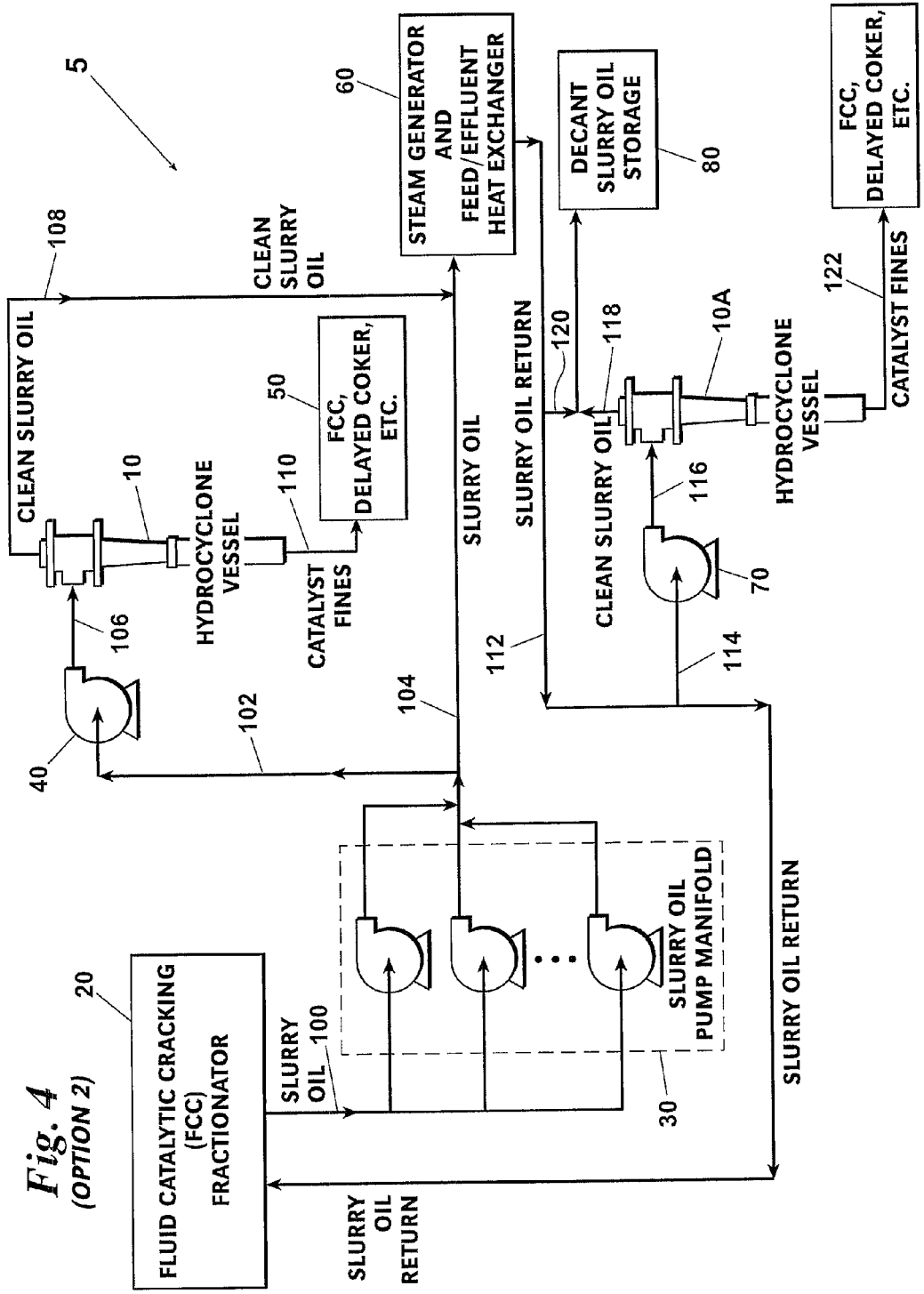
FIG. 4 is a process flow diagram of another preferred embodiment of the method. Slurry oil returned from downstream steam generators or heat exchangers is passed through one or more hydrocyclone vessels. The overflow exiting the hydrocyclone vessel, along with a portion of the returned slurry oil, may be decanted to a storage tank.

Turning now to FIG. 4, FCC slurry oil loop 5 includes a slurry oil return stream 112 from downstream steam generators or feed or effluent heat exchangers 60. A portion of slurry oil return stream 112 is routed to the FCC fractionator 20. Another portion of slurry oil stream is a decanted slurry oil stream 120. Yet another portion of stream 112 is routed to pump or pump manifold 70 as slurry oil stream 114. Pump 70 produces an elevated pressure slurry oil stream 116 that passes into and through hydrocyclone 10A. In a preferred embodiment, the pressure of stream 116 was about 4 to 4.5 greater than that of stream 114. A substantially clean, overflow slurry oil stream 118 exits hydrocyclone 10A and is routed, along with a decanted slurry oil stream 120, to a decant slurry oil storage 80 (see also FIG. 6). The catalyst, catalyst fines and coke particulates exit hydrocyclone 10A in underflow stream 122. The temperature of streams 112, 114, 116 and 118 is in a range of about 450-500° F. The pressure of overflow slurry oil stream is somewhat less than that of stream 116.

Figure 5:
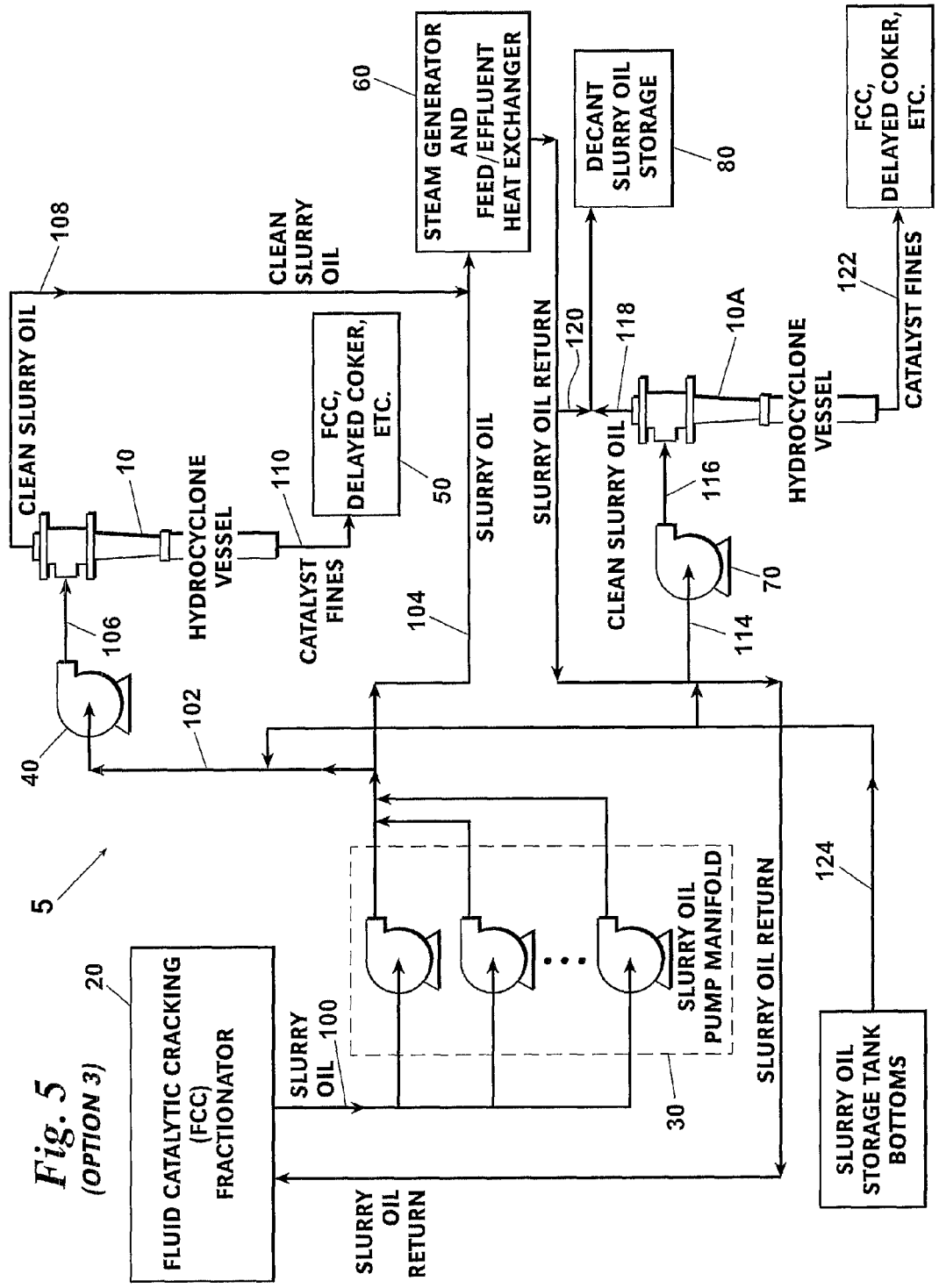
FIG. 5 is a process flow diagram of another preferred embodiment of the method. Some or all of the slurry oil from storage tank bottoms may be combined with slurry oil from the FCC fractionator and passed through a first hydrocyclone vessel or passed through a second hydrocyclone vessel. The recirculation of the slurry oil storage tank bottoms provides for continuous cleanout of the storage tank bottoms.

As shown in FIG. 5, a bottoms slurry oil stream 124, which is continuously removed from a slurry oil storage tank 90, is included in FCC slurry oil loop 5. A portion of stream 124 is routed to stream 102 and, subsequently, to hydrocyclone 10. Another portion of stream 124 is routed to stream 114 and, subsequently, to hydrocyclone 10A. Because of its low temperature, some preheat is required for stream 124 prior to entering the pumps 40, 70 or the hydrocyclones 10, 10A. In a preferred embodiment, the temperature of stream 124 is increased by about two-fold.

While preferred embodiments of a system and method for removing entrained catalyst, catalyst fines, and coke particulates from a slurry oil stream have been described with a certain degree of particularity, many changes may be made in the details of construction and the arrangement of components and steps without departing from the spirit and scope of this disclosure. The system and method therefore is not limited to the embodiments set forth herein for purposes of exemplification, but are to be limited only by the scope of the attached claims, including the full range of equivalency to which each element or step thereof is entitled.

What is claimed is:

1. A method for removing catalyst, catalyst fines, and coke particulates from a slurry oil stream, the method comprising the steps of
   i. routing a first slurry oil stream from a first slurry oil source to at least one hydrocyclone,
   ii. increasing a pressure of the first slurry oil stream to a first elevated pressure and then a higher second elevated pressure prior to it entering the at least one hydrocyclone;
   iii. passing the first slurry oil stream through the at least one hydrocyclone
   iv. routing a second slurry oil stream exiting an overflow end of the at least one hydrocyclone to a second slurry oil source;

the first and second slurry oil sources each being at least one slurry oil source selected from the group consisting of a main column of a fluid catalytic cracking fractionator, a steam generator, a heat exchanger, a decant slurry oil storage, and a slurry oil storage tank.

2. A method according to claim 1 further comprising the step of routing a third slurry oil stream flow exiting an underflow end of the at least one hydrocyclone to an underflow stream destination.

3. A method according to claim 2 wherein the second slurry oil source produces a fourth slurry oil stream having a lower temperature than that of the first slurry oil stream as the first slurry oil stream exits the first slurry oil source, the method comprising the steps of:
   i. routing the third fourth slurry oil stream from the second slurry oil source to the at least one hydrocyclone; and
   ii. raising a temperature and a pressure of the fourth slurry oil stream prior to the third fourth slurry oil stream entering the at least one hydrocyclone.

4. A method according to claim 1 wherein a third slurry oil stream exiting an underflow end of the at least one hydrocyclone is a pumpable slurry oil stream.

5. A method according to claim 1 further comprising the step of decanting at least a portion of the first slurry oil stream prior to said passing step.

6. A method according to claim 1 wherein said passing step removes about 75% to 95% of catalyst and catalyst fines in the first slurry oil stream.

7. A method according to claim 1 further comprising a recovering step after said passing step, said recovering step sending recovered catalyst and catalyst fines to a catalyst destination.

8. A method according to claim 1 further comprising a combining step after said passing step, said combining step combining the second slurry oil stream with at least one of an untreated slurry oil stream and a decant slurry oil stream.

9. A method according to claim 1 further comprising the at least one hydrocyclone providing the second slurry oil stream having a predetermined particle size distribution.

10. A method according to claim 1 wherein the at least one hydrocyclone is a ceramic hydrocyclone.

* * * * *